US008638932B2

(12) United States Patent
Kim (10) Patent No.: US 8,638,932 B2
(45) Date of Patent: Jan. 28, 2014

(54) SECURITY METHOD AND SYSTEM AND COMPUTER-READABLE MEDIUM STORING COMPUTER PROGRAM FOR EXECUTING THE SECURITY METHOD

(75) Inventor: Sun-bal Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1238 days.

(21) Appl. No.: 11/520,833

(22) Filed: Sep. 14, 2006

(65) Prior Publication Data

US 2007/0101416 A1 May 3, 2007

(30) Foreign Application Priority Data

Sep. 30, 2005 (KR) .......................... 10-2005-0092139

(51) Int. Cl.
*H04L 29/06* (2006.01)
(52) U.S. Cl.
USPC ............ 380/229; 713/168; 713/170; 713/182
(58) Field of Classification Search
USPC ................... 713/168, 170, 182; 380/282, 229
See application file for complete search history.

(56) References Cited

U.S. PATENT DOCUMENTS

| 5,390,252 | A * | 2/1995 | Suzuki et al. ................. 380/247 |
| 6,442,688 | B1 * | 8/2002 | Moses et al. ................... 713/158 |
| 6,453,159 | B1 * | 9/2002 | Lewis ........................... 455/411 |
| 6,898,618 | B1 * | 5/2005 | Slaughter et al. ............. 709/203 |
| 2002/0016846 | A1 | 2/2002 | Ono |
| 2002/0150243 | A1 | 10/2002 | Craft et al. |
| 2005/0033957 | A1 | 2/2005 | Enokida |

FOREIGN PATENT DOCUMENTS

| JP | 2001111538 A | 4/2001 |
| JP | 2001202436 A | 7/2001 |
| JP | 2002-007912 A | 1/2002 |
| JP | 2004320751 A | 11/2004 |
| JP | 2004350267 A | 12/2004 |
| JP | 2005039790 A | 2/2005 |
| JP | 2005278065 A | 10/2005 |
| KR | 10-2004-0012824 A | 2/2004 |
| KR | 10-2004-0084483 A | 10/2004 |
| WO | 0058830 A1 | 10/2000 |
| WO | 0190892 A1 | 11/2001 |
| WO | 0217557 A1 | 2/2002 |
| WO | 2005006643 A1 | 1/2005 |
| WO | WO 2005006643 A1 * | 1/2005 |

OTHER PUBLICATIONS

Public Key Encryption and Digital Signature: How do they work? , 2004, CGI Group Inc.*

(Continued)

*Primary Examiner* — Mohammad L Rahman
(74) *Attorney, Agent, or Firm* — Sughrue Mion, PLLC (57) ABSTRACT

A security method and system for maintaining security between a client and a server and a computer-readable medium storing a computer program for executing the security method are provided. The security system includes a memory which stores current authentication information; an authentication information transmission module which transmits the current authentication information to a server and receives latest authentication information from the server; an authentication information management module which authenticates the latest authentication information using the current authentication information and updates the current authentication information with the latest authentication information if the latest authentication information is successfully authenticated; and an authentication module which authenticates data received from the server using the updated current authentication information stored in the memory.

13 Claims, 5 Drawing Sheets

(56) References Cited

OTHER PUBLICATIONS

Walker et al., WO 2000/58830, Oct. 5, 2000.*
Extended European Search Report dated Mar. 19, 2010, issued in counterpart Application No. 06120270.1-1245.
Communication issued May 21, 2012 by the European Patent Office in counterpart European Application No. 06120270.1.
"Chapter 13: Key Management Techniques ED—Menezes A J; Van Oorschot P C; Vanstone S A", Handbook of Applied Cryptography, CRC Press Series on Discrete Mathematics and its Applications, Boca Raton, FL, US, pp. 543-590, Oct. 1, 1996, XP001525013.
Office Action issued Jul. 17, 2012 by the Japanese Patent Office in counterpart Japanese Application No. 2006-269569.
Communication dated Oct. 22, 2012 issued by the European Patent Office in counterpart European Patent Application No. 06 120 270.1.
Communication dated Jan. 11, 2012 issued by the State Intellectual Property Office of P.R. China in counterpart Chinese Patent Application No. 200610153884.X.
Communication dated Feb. 21, 2012 issued by the Japanese Patent Office in counterpart Japanese Patent Application No. 2006-269569.

* cited by examiner

SECURITY METHOD AND SYSTEM AND COMPUTER-READABLE MEDIUM STORING COMPUTER PROGRAM FOR EXECUTING THE SECURITY METHOD

CROSS-REFERENCE TO RELATED PATENT APPLICATION

This application claims the benefit of Korean Patent Application No. 10-2005-0092139, filed on Sep. 30, 2005, in the Korean Intellectual Property Office, the disclosure of which is incorporated herein in its entirety by reference.

BACKGROUND OF THE INVENTION

1. Field of the Invention

The present invention relates to information security, and more particularly, to a security method and system for maintaining security between a client and server and a computer-readable medium storing a computer program for executing the security method.

2. Description of the Related Art

Recently, more home appliances have been developed to access the Internet and to include universal serial buses (USBs) or compact discs (CDs), thereby enabling users to input or output data. Such consumer electronics (CE) devices have evolved from home appliances providing simple functions to devices capable of performing complicated functions while communicating with external devices with the aid of high-performance, multi-functional operating systems (OSs). Accordingly, the demand for updating existing OSs and software programs has steadily grown. However, the maintenance of security when inputting data to CE devices or allowing CE devices to receive update files has not been sufficiently taken into account, thus exposing CE devices to the risk of being damaged by malicious attacks, such as viruses or hacking, or being accessed by unauthorized users.

Conventionally, a client encrypts data with its own private key and transmits the encrypted data to a server. Then, the server authenticates the encrypted data, encrypts data to be transmitted to the client with its own private key, and transmits the encrypted data to be transmitted to the client. In other words, the client and the server authenticate each other and then decide to transmit data to each other based on the authentication results. Such conventional security techniques, however, involve encryption and decryption processes that are highly complicated and time-consuming. In particular, the performance of CE devices may considerably deteriorate when such conventional security techniques are applied to the CE devices. Therefore, it is necessary to develop efficient security methods and systems.

SUMMARY OF THE INVENTION

An aspect of the present invention provides a simple and efficient security method and system at a high operating speed, and a computer-readable medium storing a computer program for executing the security method.

Another aspect of the present invention provides a security method and system in which a client manages authentication information with reference to authentication information received from a server and can authenticate files received from an external device, and a computer-readable medium storing a computer program for executing the security method.

According to an aspect of the present invention, there is provided a security method to maintain security including: transmitting current authentication information of a client to a server; enabling the server to generate latest authentication information for the client based on the current authentication information of the client and to transmit the latest authentication information to the client; enabling the client to authenticate the latest authentication information using the current authentication information of the client; and if the latest authentication information is successfully authenticated by the client, updating the current authentication information of the client with reference to the latest authentication information.

The security method may also include: enabling the client to issue a request for data to the server; enabling the server to transmit the requested data to the client; and enabling the client to authenticate the data transmitted by the server using the updated current authentication information of the client.

According to another aspect of the present invention, there is provided a security method to maintain security including: transmitting current authentication information to a server; receiving latest authentication information, which is generated based on the current authentication information by the server, from the server; authenticating the latest authentication information using the current authentication information; and updating the current authentication information with the latest authentication information if the latest authentication information is successfully authenticated.

The updating of the current authentication information may include: determining whether the current authentication information needs to be updated by comparing the current authentication information with the latest authentication information; and if the current authentication information needs to be updated, updating the current authentication information with the latest authentication information.

The security method may also include: receiving data from the server; and authenticating the data using the updated current authentication information.

The security method may also include: issuing a request for a list of files that can be provided by the server to the client; receiving the requested file list from the server; authenticating the received file list using the current authentication information; issuing a request for one of the files included in the received file list to the server; downloading the requested file from the server; and authenticating the downloaded file using the updated current authentication information.

The current authentication information may include public key information.

The latest authentication information may include latest public key information for a client and a digital signature for the latest public key information, the authentication of the latest authentication information may include verifying the digital signature using the public key information included in the current authentication information, and the updating of the latest authentication information may include updating the public key information included in the current authentication information with the latest public key information.

The current authentication information may include public key information, the authentication of the latest authentication information may include verifying a first digital signature included in the latest authentication information using the public key information included in the current authentication information, the updating of the latest authentication information may include updating the public key information included in the current authentication information with public key information included in the latest authentication information, and the authentication of the data may include verifying a second digital signature included in the data using the public key information included in the current authentication information.

According to another aspect of the present invention, there is provided a security method to maintain security including: receiving current authentication information from a client; and generating latest authentication information based on the current authentication information and transmitting the latest authentication information to the client.

According to another aspect of the present invention, there is provided a security system for maintaining security including: a memory which stores current authentication information; an authentication information transmission module which transmits the current authentication information to a server and receives latest authentication information from the server; an authentication information management module which authenticates the latest authentication information using the current authentication information and updates the current authentication information with the latest authentication information if the latest authentication information is successfully authenticated; and an authentication module which authenticates data received from the server using the updated current authentication information stored in the memory.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE EXEMPLARY EMBODIMENTS OF THE INVENTION

The present invention will now be described more fully with reference to the accompanying drawings in which exemplary embodiments of the invention are shown.

Figure 1:
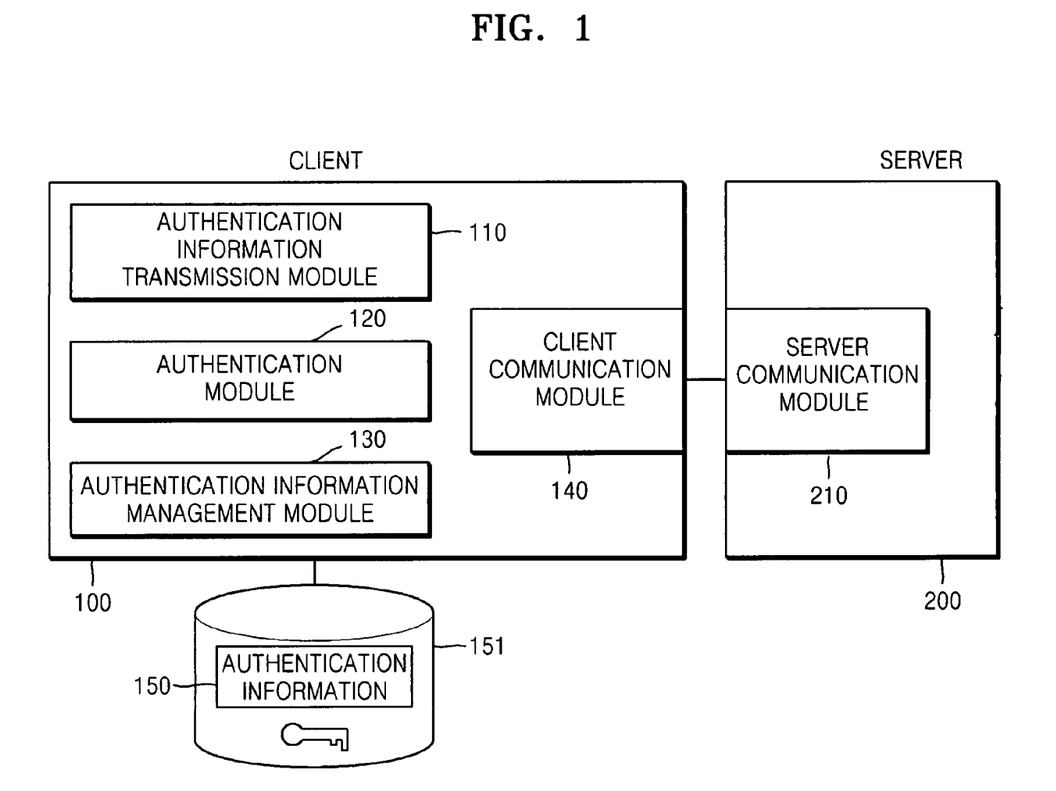
FIG. 1 is a block diagram of a security system according to an exemplary embodiment of the present invention.

FIG. 1 is a block diagram of a security system according to an exemplary embodiment of the present invention. In the security system of FIG. 1, a client 100 and a server 200 communicate with each other via a client communication module 140 and a server communication module 210. The client communication module 140 and the server communication module 210 support wired or wireless communication. The server 200 is a system for providing authentication information and data to the client 100 and generates and manages an authentication key.

Referring to FIG. 1, the client 100 includes an authentication information transmission module 110, an authentication module 120, and an authentication information management module 130. Authentication information 150 is stored in a memory 151. The authentication information 150 is required for authenticating and decoding data and may be stored in the memory 151 before the manufacture of the client 100 in order to efficiently perform an authentication operation when using the client 100.

The authentication information transmission module 110 transmits the authentication information 150 stored in the memory 151 to the server 200 and receives latest authentication information from the server 200. The authentication information 150 may include public key information. In addition, the server 200 transmits the latest authentication information, which is used to update an existing public key and includes the latest public key information and a digital signature for the latest public key information. Also, the server 200 authenticates the client 100 based on the authentication information 150 transmitted by the client 100, searches for information on authentication information for the client 100, generates the latest authentication information based on the search results, and transmits the latest authentication information to the client 100. Here, a digital signature is a type of electronic signature using a public key-based encryption method (i.e., an asymmetric encryption method). Since a digital signature is different from the encryption of an entire electronic document by a transmitter, it can efficiently facilitate an authentication operation.

The authentication module 120 authenticates data received from the server 200 with the aid of the authentication information 150, thereby determining the integrity of the data. The server 200 may add a digital signature to data and transmit the data to the client 100. Then, the client 100 may authenticate the data transmitted by the server 200 by verifying the digital signature included in the data transmitted by the server 200 using a public key included in the authentication information 150.

The authentication information management module 130 updates the authentication information 150 with the latest authentication information received from the server 200, thereby keeping authentication information for the client 100 up-to-date. The authentication information management module 130 verifies a digital signature included in the latest authentication information and replaces the public key information included in the authentication information 150 with the latest public key information included in the latest authentication information received from the server 200. The updated result may be used later for authenticating data transmitted by the server 200.

Figure 2:
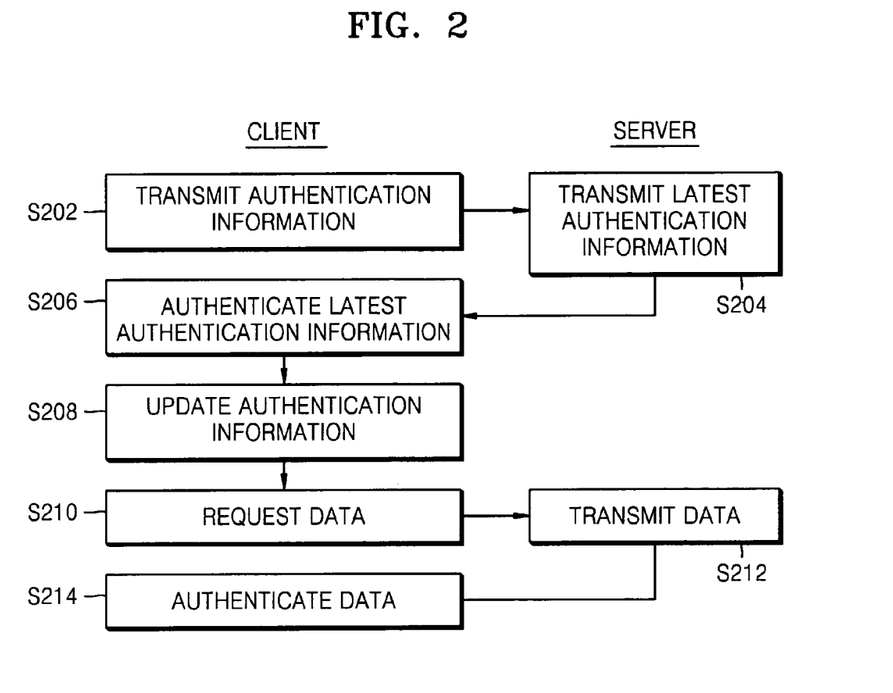
FIG. 2 is a flowchart for explaining a security method according to an exemplary embodiment of the present invention.

FIG. 2 is a flowchart for explaining a security method according to an exemplary embodiment of the present invention. Referring to FIG. 2, in operation S202, a client transmits its authentication information to a server. The authentication information transmitted by the client may include public key information regarding a public key of the client. In operation S204, the server generates latest authentication information based on the authentication information transmitted by the client and transmits the latest authentication information to the client. Also, the server may determine a current state of the client based on the authentication information transmitted by the client, search for information that can be authenticated by the client, and transmit the search results to the client. The latest authentication information transmitted by the server may include latest public key information for the client and a digital signature for the latest public key information.

In operation S206, the client authenticates, using its authentication information, the latest authentication information transmitted by the server before using the latest authentication information. In other words, the client may decrypt the latest authentication information or may interpret the digital signature included in the latest authentication information using its public key, thereby determining whether the latest authentication information is safe.

In operation S208, if the latest authentication information transmitted by the server is successfully authenticated by the client, the authentication information of the client is updated with the latest authentication information. In other words, the public key information included in the authentication information of the client is updated with the latest public key information included in the latest authentication information so that the updated public key can be used for determining the integrity of data transmitted afterwards by the server. If the client issues a request for data to the, server in operation S210, the server adds a digital signature to the data and transmits the resulting data to the client in operation S212. Then, in operation S214, the client verifies the digital signature included in the data transmitted by the server using the updated public key obtained in operation S208, thereby authenticating the data transmitted by the server.

Figure 3:
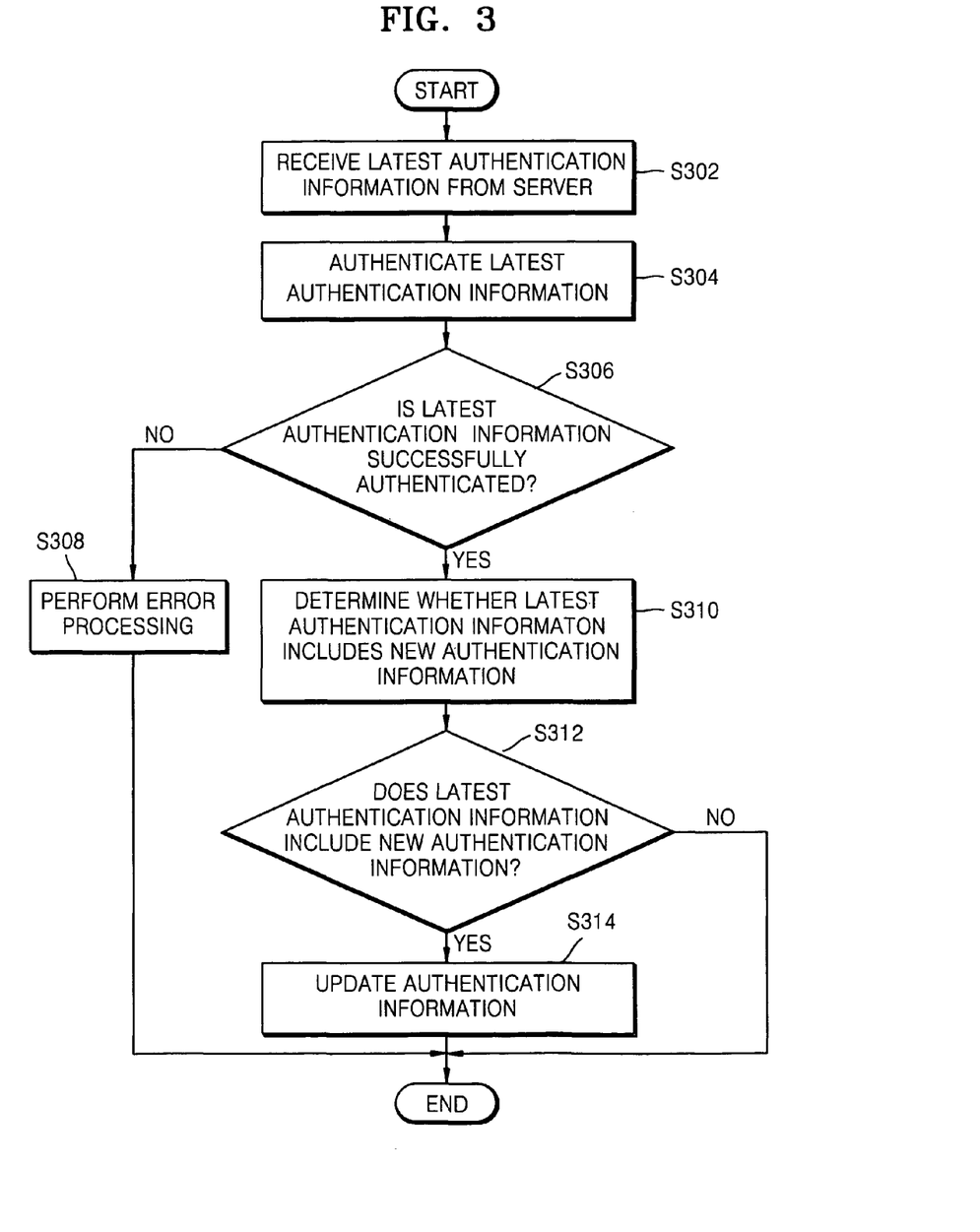
FIG. 3 is a flowchart for explaining an operation of an authentication information management module of FIG. 1, according to an exemplary embodiment of the present invention.

FIG. 3 is a flowchart for explaining an operation of the authentication information management module 130 of FIG. 1, according to an exemplary embodiment of the present invention. Referring to FIG. 3, in operation S302, latest authentication information is received from a server. In operation S304, the latest authentication information is authenticated using current authentication information. If the latest authentication information is successfully authenticated in operation S306, i.e., if the latest authentication information is determined to have integrity in operation S306, it is determined whether the latest authentication information includes new authentication information to be updated in operation S310.

If the latest authentication information is determined to include new authentication information to be updated in operation S312, the current authentication information is updated with the new authentication information included in the latest authentication information in operation S314. If the authentication of the latest authentication information fails in operation S306, an error processing operation is performed in operation S308, and the operation of the authentication information management module 130 is terminated.

Figure 4:
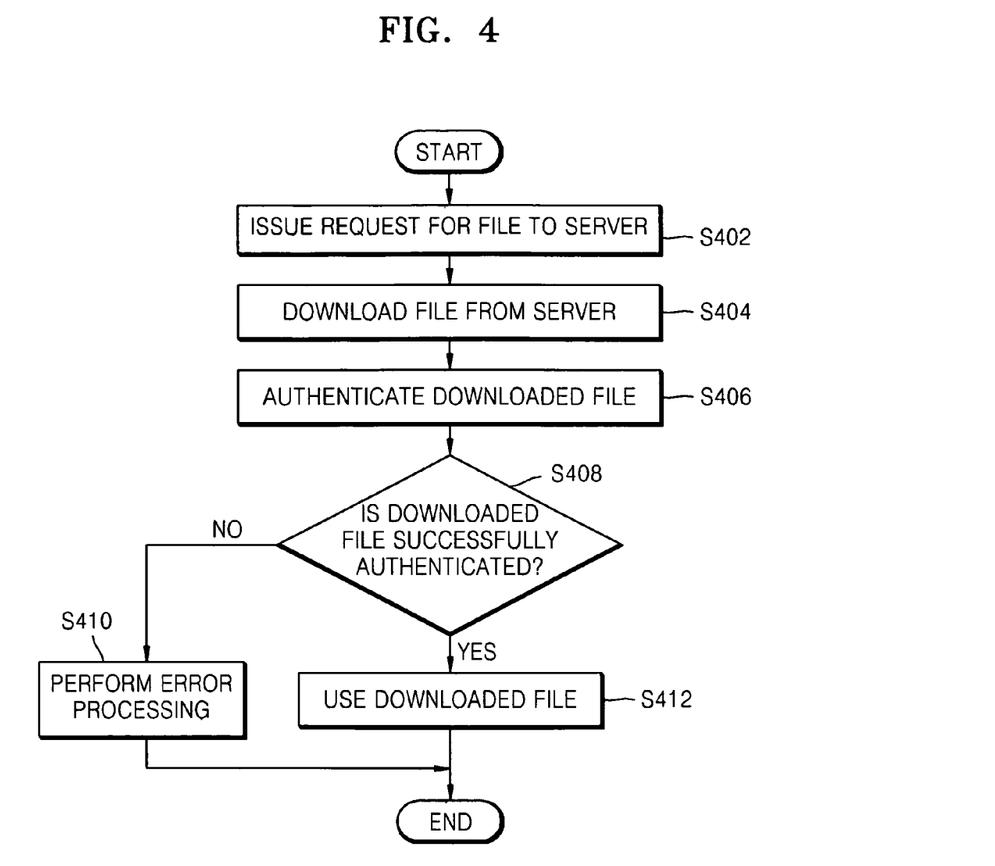
FIG. 4 is a flowchart for explaining an operation of an authentication module of FIG. 1, according to an exemplary embodiment of the present invention.

FIG. 4 is a flowchart for explaining an operation of the authentication module 120 of FIG. 1, according to an exemplary embodiment of the present invention. As described above, a client may use its authentication information, which is managed in the above-described manner, to authenticate files received from an external device. Referring to FIG. 4, in operation S402, the client issues a request for a file, e.g., a new version of a software program, to a server. In operation S404, the client downloads the file from the server. In operation S406, the client authenticates the downloaded file using its authentication information. If the downloaded file is successfully authenticated in operation S408, the client opens and uses the downloaded file in operation S412. On the other hand, if the authentication of the downloaded file fails in operation S408, the client determines the downloaded file to have been transmitted by an unauthorized system and performs an error processing operation in operation S410. Thereafter, the operation of the authentication module 120 is terminated.

Figure 5:
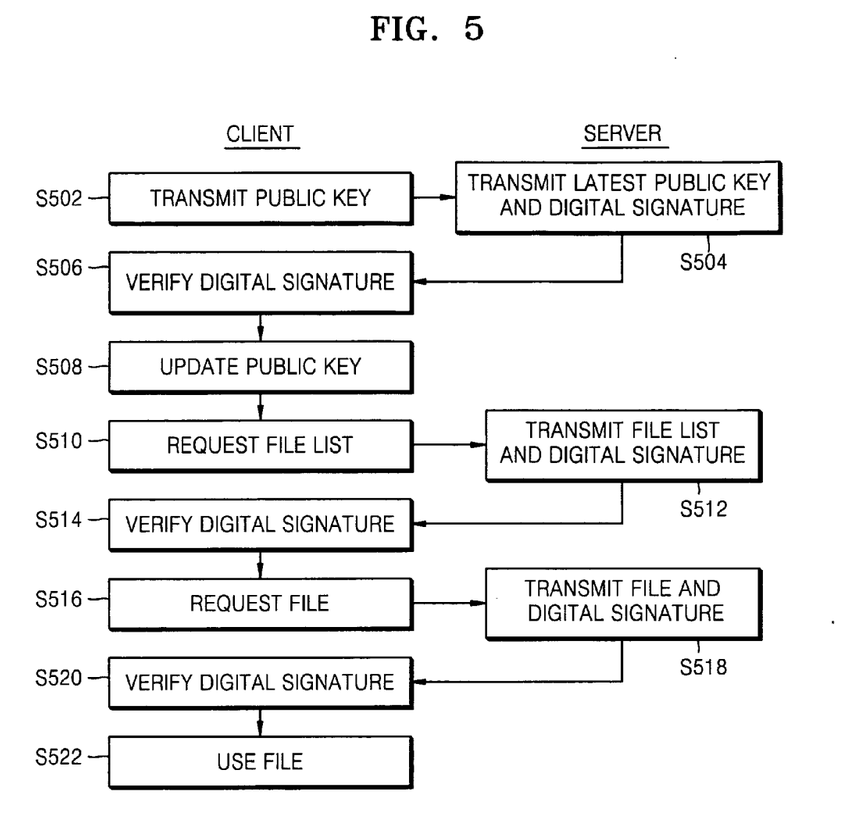
FIG. 5 is a flowchart for explaining a security method according to another exemplary embodiment of the present invention.

FIG. 5 is a flowchart for explaining a security method according to another exemplary embodiment of the present invention, and particularly, for explaining the downloading of a file from a server by a client. Referring to FIG. 5, in operation S502, the client accesses the server and transmits its current public key information to the server in order to download a file from the server. In operation S504, the server transmits latest authentication information, which includes latest public key information and a digital signature for the latest public key information, to the client.

In operation S506, the client verifies the digital signature included in the latest authentication information using the current public key information. If the latest authentication information is determined to be safe, the client decides whether to update the current public key information with the latest public key information by comparing the current public key information with the latest public key information. In operation S508, if the client decides to update the current public key information with the latest public key information based on the comparison results, the current public key information is updated with the latest public key information. If the authentication of the latest authentication information fails, an error is issued and the communication with the server may be terminated. If the comparison results show that there is no need for the client to update the current public key information with the latest public key information, the updating of the current public key information with the latest public key information is not carried out.

In operation S510, the client issues a request of a list of files that can be provided by the server to the client. In operation S512, the server transmits the requested file list to the client as a file or as a data type other than a file, together with a digital signature. In operation S514, the client authenticates the file list transmitted by the server by verifying the digital signature transmitted together with the file list using a public key. In operation S516, if the file list is determined to be safe, the client issues a request for one of the files included in the file list to the server. In operation S518, the server transmits the requested file and a digital signature to the client. In operation S520, the client authenticates the file transmitted by the server. In operation S522, if the file transmitted by the server is determined to be safe, the client uses this file. For example, the client transmits the file to a software module, which has requested the file.

The security methods according to exemplary embodiments of the present invention can be realized as computer-readable code written on a computer-readable medium.

As described above, according to an exemplary embodiment of the present invention, it is possible to enable secure data transmission and prevent a client from being damaged by malicious programs by maintaining the security of data input to or output from the client. In addition, it is possible to maintain the security of data in a simple manner and thus provide an efficient security function that does not deteriorate the performance of a CE device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A security method comprising:
    enabling a client to transmit current public key information of the client to a server;
    enabling the server to authenticate the client based on the current public key information of the client, generate latest authentication information for the client, which includes latest public key information and a digital signature for the latest public key information, by searching information on authentication information for the client, and to transmit the latest authentication information to the client;
    enabling the client to authenticate the latest authentication information using the current public key information of the client; and
    after the latest authentication information is successfully authenticated by the client, enabling the client to update the current public key information of the client with reference to the latest public key information included in the latest authentication information.

2. The security method of claim 1, further comprising:
enabling the client to issue a request for data to the server;
enabling the server to transmit the requested data with a digital signature added to the client; and
enabling the client to authenticate the data transmitted by the server using the updated current public key information of the client.

3. A security method comprising:
transmitting current public key information to a server;
receiving latest authentication information including latest public key information and a first digital signature for the latest public key information, which is generated by searching information on authentication information for the client by the server, from the server;
authenticating the latest authentication information using the current public key information; and
updating the current public key information with the latest public key information included in the latest authentication information after the latest authentication information is successfully authenticated.

4. The security method of claim 3, wherein the updating of the current public key information comprises:
determining whether the current public key information needs to be updated by comparing the current public key information with the latest public key information; and
when the current public key information needs to be updated, updating the current public key information with the latest public key information.

5. The security method of claim 3, further comprising:
receiving data including a second digital signature from the server; and
authenticating the data using the updated current public key information.

6. The security method of claim 3 further comprising:
issuing a request for a file list that can be provided by the server;
receiving the requested file list from the server;
authenticating the received file list using the current public key information;
issuing a request for a file included in the received file list to the server;
downloading the requested file from the server; and
authenticating the downloaded file using the updated current public key information.

7. The security method of claim 3, wherein the authentication of the latest authentication information comprises verifying the first digital signature included in the latest authentication information using the current public key information.

8. The security method of claim 5, wherein the authentication of the latest authentication information comprises verifying a first digital signature included in the latest authentication information using the current public key information, and
wherein the authentication of the data comprises verifying a second digital signature included in the data using the updated current public key information.

9. A security method comprising:
receiving current public key information from a client;
authenticating the client based on the current public key information; and
generating latest authentication information including latest public key information and a first digital signature for the latest public key information, by searching information on authentication information for the client, and transmitting the latest authentication information to the client,
wherein the latest public key information is information to which the current public key information of the client will be updated.

10. The security method of claim 9, further comprising:
receiving a request for data issued by the client; and
transmitting the requested data and a second digital signature for the requested data to the client.

11. A non-transitory computer-readable medium storing a computer program for executing a security method, the security method comprising:
enabling a client to transmit current public key information of the client to a server;
enabling the server to authenticate the client based on the current public key information of the client, generate latest authentication information for the client, which includes latest public key information and a digital signature for the latest public key information, by searching information on authentication information for the client, and to transmit the latest authentication information to the client;
enabling the client to authenticate the latest authentication information using the current public key information of the client; and
after the latest authentication information is successfully authenticated by the client, enabling the client to update the current public key information of the client with reference to the latest public key information included in the latest authentication information.

12. A security system comprising:
a memory which stores current public key information;
an authentication information transmission module which transmits the current public key information to a server and receives latest authentication information including latest public key information with a first digital signature added, which is generated by searching information on authentication information for the client by the server that has authenticated the security system based on the current public key information, from the server;
an authentication information management module which authenticates the latest authentication information using the current public key information and updates the current public key information stored in the memory with the latest public key information included in the latest authentication information when the latest authentication information is successfully authenticated; and
an authentication module which authenticates data including a second digital signature received from the server using the updated current public key information stored in the memory.

13. The security system of claim 12,
wherein the authentication information management module verifies a first digital signature included in the latest authentication information using the current public key information, and
wherein the authentication module verifies a second digital signature included in the data received from the server using the updated current public key information.

* * * * *